(12) United States Patent
Beach et al.

(10) Patent No.: US 11,074,471 B2
(45) Date of Patent: Jul. 27, 2021

(54) ASSISTED CREATION OF VIDEO RULES VIA SCENE ANALYSIS

(71) Applicant: Alarm.com Incorporated, Tysons, VA (US)

(72) Inventors: Allison Beach, Leesburg, VA (US); Adam Rodriguez, Tysons, VA (US); Donald Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 105 days.

(21) Appl. No.: 16/553,736

(22) Filed: Aug. 28, 2019

(65) Prior Publication Data

US 2020/0074210 A1 Mar. 5, 2020

Related U.S. Application Data

(60) Provisional application No. 62/724,060, filed on Aug. 29, 2018.

(51) Int. Cl.
  *G06K 9/32* (2006.01)
  *G06K 9/00* (2006.01)
  *G06K 9/62* (2006.01)

(52) U.S. Cl.
  CPC ....... *G06K 9/3241* (2013.01); *G06K 9/00664* (2013.01); *G06K 9/00744* (2013.01); *G06K 9/6215* (2013.01)

(58) Field of Classification Search
  None
  See application file for complete search history.

(56) References Cited

U.S. PATENT DOCUMENTS

| 2013/0038737 | A1* | 2/2013 | Yehezkel | G11B 27/28 348/159 |
| 2013/0182114 | A1 | 7/2013 | Zhang et al. | |
| 2017/0103264 | A1 | 4/2017 | Javan Roshtkhari et al. | |

OTHER PUBLICATIONS

International Search Report and Written Opinion in International Application No. PCT/US19/48517, dated Nov. 18, 2019, 10 pages.

* cited by examiner

*Primary Examiner* — Leon Flores
(74) *Attorney, Agent, or Firm* — Fish & Richardson P.C.

(57) ABSTRACT

Techniques are described for assisted creation of video rules via scene analysis. In some implementations, a scene is obtained, a shape of an element in a ground plane shown in the images of the scene is identified, user input that defines a shape of a region of interest used in a video rule is obtained, that the shape of the region satisfies a reshape criteria based on the shape of the element in the ground plane shown in the images of the scene is determined, and a reshaped region based on the shape of the element in the ground plane shown in the images of the scene is determined.

20 Claims, 3 Drawing Sheets

ASSISTED CREATION OF VIDEO RULES VIA SCENE ANALYSIS

CROSS-REFERENCE TO RELATED APPLICATION

This application claims the benefit of U.S. Provisional Patent Application No. 62/724,060, filed on Aug. 29, 2018 and titled "ASSISTED CREATION OF VIDEO RULES VIA SCENE ANALYSIS," which is incorporated herein by reference in its entirety.

TECHNICAL FIELD

This disclosure application relates generally to monitoring systems, and more particularly, to video analytics in monitoring systems.

BACKGROUND

A monitoring system for a property can include various components including sensors, cameras, and other devices. A user can configure the monitoring system by placing components and defining monitoring video rules for monitoring the property.

SUMMARY

Techniques are described for assisted creation of video rules via scene analysis. Video rules may be used to perform video analytics in a monitoring system. A video rule may define a condition for which the monitoring system uses video analytics to determine whether it is satisfied, and define an action that the monitoring system is to perform in response to determining that the condition is satisfied. For example, a video rule may define that any time a human is detected in a particular region of a scene shown in video captured by a particular camera, the monitoring system should send an image in from the video to a home owner.

Video rules may be defined by users. For example, to create a rule a user may view video captured by a camera and then draw a shape for a region to define a rule that anytime a human is detected in the region, the monitoring system should send an image from the video to a home owner. However, it can be hard to convey to a novice user how to define a rule to get good performance from video analytics. For example, a region may not function as intended if it includes a tree which occludes the ground, or a door that swings open into the area. In another example, ground plane rules, such as a tripwire that is drawn as a line on the video in 2-D but is evaluated by the software as if it lies along the ground, i.e., a person will only trip it if their feet cross the line, are often hard for novice users to create and tune to get satisfactory results. A novice may draw a line only in the sky where a person's head might cross not realizing that because a person's feet will never cross the line the video rule will never trigger sending an image.

Accordingly, a system that assists in the creation of video rules via scene analysis may collect a variety of inputs from both cameras and other data collecting devices, if available, to automatically determine a scene and the surrounding area including the ground plane, horizon line, and occluding objects. A ground plane may refer to the parts of the video that correspond to the ground. Based on the scene analysis, the system may predict where people or animals are likely to walk or loiter, or where cars are expected to navigate. The system may then automatically create regions along these pathways so the user won't have to spend the time setting up the rules themselves, assist the user in creating rules by highlighting the ground plane and guiding the rule placement, or assist the user in creating rules by determining a drawn shape is sufficiently similar to an element of the ground plane and reshaping the shape to a shape of the element of the ground plane. As detection of events in these zones may be determined with a fuller understanding of the scene, a user may more easily define video rules resulting in event being detected how the user intended.

In some aspects, the subject matter described in this specification may be embodied in methods that may include the actions of obtaining images of a scene, identifying a shape of an element in a ground plane shown in the images of the scene, obtaining user input that defines a shape of a region of interest used in a video rule, determining that the shape of the region satisfies a reshape criteria based on the shape of the element in the ground plane shown in the images of the scene, and determining a reshaped region based on the shape of the element in the ground plane shown in the images of the scene.

Other versions include corresponding systems, apparatus, and computer programs, configured to perform the actions of the methods, encoded on computer storage devices.

These and other versions may each optionally include one or more of the following features. For instance, in some implementations, determining that the shape of the region satisfies a reshape criteria based on the shape of the element in the ground plane shown in the images of the scene includes determining that a similarity of the shape of the region to the shape of the element in the ground plane satisfies a similarity threshold and in response to determining that the similarity of the shape of the region to the shape of the element in the ground plane satisfies the similarity threshold, determining that the shape of the region satisfies the reshape criteria.

In certain aspects, determining that a similarity of the shape of the region to the shape of the element in the ground plane satisfies a similarity threshold includes determining that the similarity of the shape of the region to a trapezoid shape of a driveway identified in the ground plane satisfies the similarity threshold. In some aspects, the operations include generating a video rule based on the reshaped region and providing the video rule based on the reshaped region to a camera that captured the images of the scene.

In some implementations, the operations includes providing an indication of the reshaped region to a user and receiving second user input that indicates to use the reshaped region for the video rule, where generating the video rule based on the reshaped region is in response to receiving the second input that indicates to use the reshaped region for the video rule. In certain aspects, generating a video rule based on the reshaped region occurs without additional input from a user after obtaining the user input that defines the shape of the region of interest used in the video rule.

In some aspects, obtaining user input that defines a shape of a region of interest used in a video rule includes obtaining another image of the scene after the shape of the element in the ground plane shown in the images of the scene is identified, providing the another image of the scene from which the shape of the element in the ground plane shown in the images of the scene was not identified, and obtaining the user input while the another image of the scene is displayed.

The details of one or more implementations are set forth in the accompanying drawings and the description below.

Other features will be apparent from the description and drawings, and from the claims.

DESCRIPTION OF DRAWINGS

Like reference symbols in the various drawings indicate like elements.

DETAILED DESCRIPTION

Techniques are described for assisting creation of video rules via scene analysis.

Figure 1:
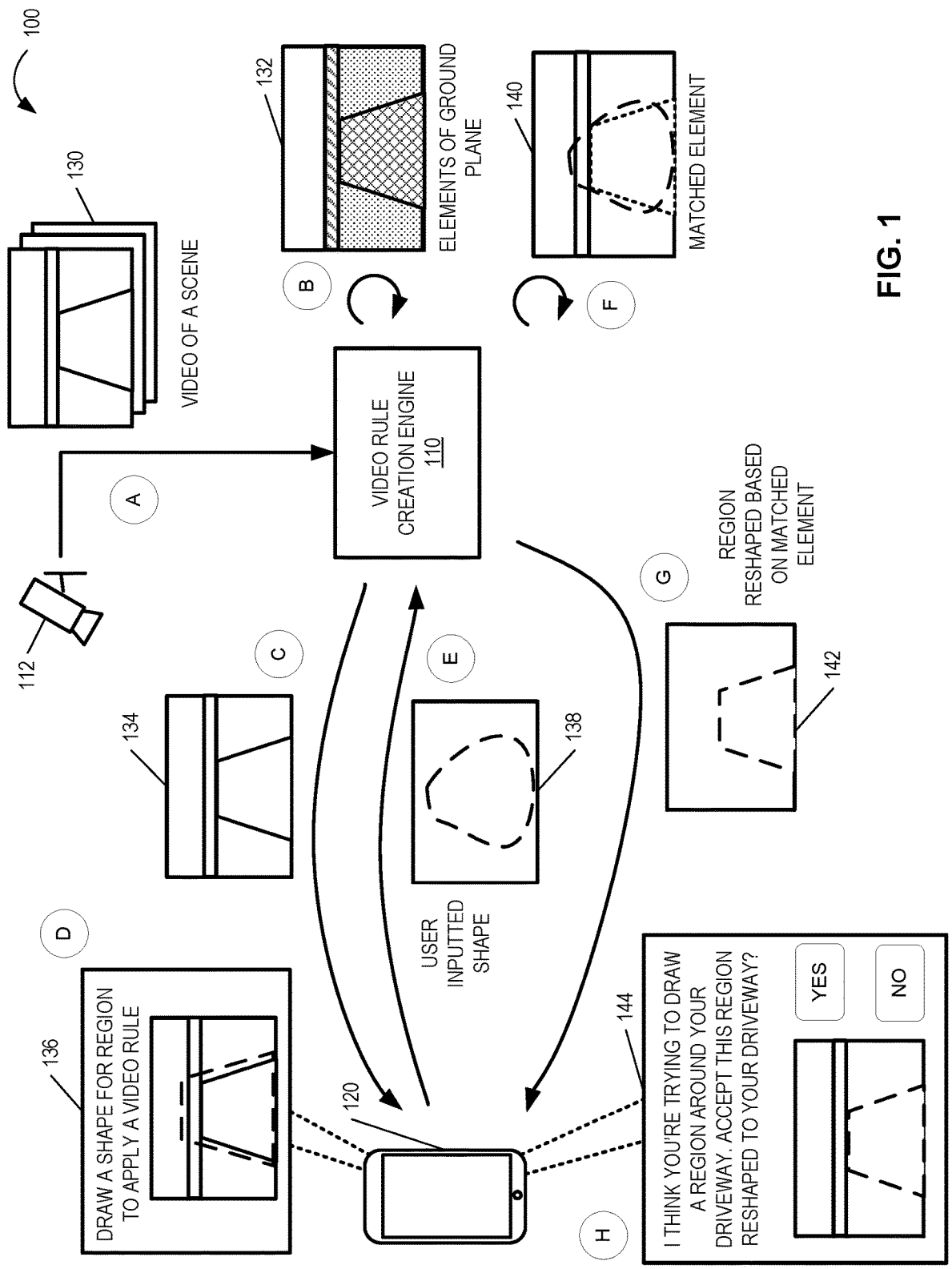
FIG. 1 illustrates an example block diagram of a system that assists creation of video rules via scene analysis.

FIG. 1 illustrates an example block diagram of a system 100 that assists creation of video rules via scene analysis. The system 100 includes a video rule creation engine 110 and a client device 120. The video rule creation engine 110 may assist a user in interacting with the client device 120 to create a video rule.

The video rule creation engine 110 may receive video of a scene captured by a camera 112 (Stage A 130). The video may include multiple images of a scene that are captured at sequential times. For example, the camera 112 may be placed on an outside of a garage of a property and the video rule creation engine 110 may receive, from the camera 112, video of a driveway of a property, grass on a yard of the property, and a road connected to the driveway and provide images at a rate of five images a minute.

The video rule creation engine 110 may analyze the video of the scene and determine elements of a ground plane (Stage B 132). An element of a ground plane may refer to a part of the ground plane. For example, an element of a ground plane may refer to a first portion of the ground plane shown in the image that corresponds to grass, a second element of the ground plane may refer to a second portion of the ground plane shown in the image that corresponds to a driveway. The video rule creation engine 110 may analyze images of the video to identify a ground plane and then determine elements of the ground plane. For example, the video rule creation engine 110 may use object recognition, analyze shadows, movement of feet, movement of wheels, colors/textures/appearance that match grass, colors that match pavement, and other factors to determine a ground plane and elements of the ground plane. In some implementations, the video rule creation engine 110 may use top-down analysis and scene context. For example, if the scene contains a car and a mailbox, top-down analysis and scene context may help the video rule creation engine 110 recognize a driveway or a sidewalk.

The video rule creation engine 110 may provide an image or video of the scene for the client device 120 to display to a user to enable the user to draw a shape of a region for a video rule (Stage C 134). The video rule creation engine 110 may provide the image or video in response to the client device 120 providing an indication to the video rule creation engine 110 that a user has specified that the user would like to create a new video rule. In some implementations, the video rule creation engine 110 may additionally provide highlighting information. For example, the video rule creation engine 110 may provide to the client device 120 highlighting information that specifies where the ground plane is in the image or video. In another example, the video rule creation engine 110 may provide an overlay that shows each of the elements of the ground plane in different colors.

The client device 120 may display the image or video of the scene to the user for the user to draw a shape (Stage D 136). For example, the client device 120 may display a graphical user interface that includes an image of the driveway, grass, and road with the text "draw a shape for region to apply a video rule" and receive user input that defines a shape that covers the driveway and part of the road as shown in the image. In some implementations the client device 120 may provide visual indicators that may help users understand that the image represents a 3-D scene. For example, the client device 120 may also overlay a grid where the grid follows the ground plane shown in the interface and each square in the grid as displayed on the client device 120 corresponds to a similar area in the scene, e.g., squares that are closer to a camera appear larger and squares further from the camera appear smaller and each square covers a nine square foot area in the scene. In some implementations, the system may show an animation of a person or vehicle triggering the rule based on the drawn shape and/or the implied perspective of the detected ground plane to make the expected behavior of the rule clear.

The client device 120 may provide the user inputted shape to the video rule creation engine 110 (Stage E 138). For example, the client device 136 may provide the shape that covers the driveway and part of the road as shown in the image to the video rule creation engine 110. The client device 120 may provide the shape in a form of coordinates of vertices.

The video rule creation engine 110 may determine whether the shape received satisfies a reshape criteria based on the shapes of elements determined in the ground plane and, in response to determining satisfaction, determine that the shape receives matches an element of the ground plane (Stage F 140). For example, the video rule creation engine 110 may determine that the shape drawn by the user matches a trapezoid shape of a driveway shown in the video. The shape received that covers part of the road may result in detections of many more events than a user desired as the user may have only wanted to detect for humans or vehicles on the driveway but as part of the shape covers the road, the shape drawn may trigger when humans or vehicles pass on the road.

The video rule creation engine 110 may then provide the region reshaped based on the matched element to the client device 120 (Stage G 142). For example, the video rule creation engine 110 may provide the trapezoid shape of the driveway along with an indication that the shape is for a driveway.

The client device 120 may receive the reshaped region from the video rule creation engine 110 and, in response, provide a prompt to the user asking whether the user would like to use the reshaped region (Stage H). For example, the client device 120 may display a graphical user interface that includes the text "I think you're trying to draw a region around your driveway. Accept this region reshaped to your driveway?" along with "Yes" and "No" selectable buttons. The client device 120 may then provide the user's response to the prompt the video rule creation engine 110 which may then use the reshaped region if the user responds with an affirmative and use the original user inputted shape if the user responds with a negative. For example, the video rule creation engine 110 may provide a video rule to the camera 112 that specifies that the camera 112 should detect for when a person's feet walks into the reshaped region and, in response to a detection, provide an image from the camera 112 to a user.

In some implementations, instead of prompting the user to indicate whether the user would like to use the reshaped region, the video rule creation engine 110 may decide to use the reshaped region without asking the user whether the user would like to use the reshaped region. For example, the video rule creation engine 110 may provide to the client device 120 the reshaped region along with text "I think you're trying to draw a region around your driveway so I've reshaped the region to your driveway as shown." In other implementations, the video rule creation engine 110 may not provide an indication to the client device 120 that the reshaped region is being used instead of the user's originally input shape, and simply use the reshaped region.

In some implementations, if in Stage D the user is trying to draw a tripwire across a doorway or driveway entrance, for example, the user may draw the tripwire slightly short of the full span, leaving a small gap where the object might pass undetected. The video rule creation engine 110, understanding the scene segmentation and the full navigable area of the ground plane, could extend this tripwire to or past the edges (with or without user confirmation of this change), and further communicate the intent of this rule for evaluation of the video rule, making sure the rule fires appropriately.

In some implementations, once the camera 112 is mounted and begins collecting images, the video rule creation engine 110 may begin static scene analysis. This analysis may use a variety of image segmentation, e.g., labeling each pixel in the image as, for instance, "grass", "tree", "sidewalk", "building," and geometric analysis, e.g., finding the horizon/vanishing points in an image to establish an estimate of camera parameters, techniques to identify pixels in the image which likely lie on the ground plane of the scene. For example, the sidewalk and grass are on the ground plane and the video rule creation engine 110 expects people to walk on the sidewalk and grass. Trees and buildings may not be part of the ground plane and the video rule creation engine 110 may understand that the trees and buildings occlude the ground behind them for some distance.

Static scene analysis may be performed whenever the view of the camera changes, either because it is moved or because the scene itself has changed significantly, e.g., a parked car moves, an item of furniture is removed, etc. History of past scene analysis may be useful, for example, if the ground became covered in snow, the image segmentation might have difficulty determining the ground plane, but if the camera has not moved, previous static scene analysis could be used as a guide.

Additionally or alternatively, the video rule creation engine 110 may use dynamic scene analysis that occurs on an ongoing basis which serves to refine the static analysis and guide the placement and behavior of rules. Dynamic scene analysis may include tracking moving objects, e.g., people and vehicles, throughout the scene and observing (i) if they violate assumptions about where the ground plane is and what are occluding objects and ii) what common patterns of motion are in the scene. The former can be used to adjust the determination of the ground plane and possibly used to inform static image segmentation for future runs. The latter can be used to suggest better rules based on common traffic patterns, e.g. "people tend to walk around the tripwire you've drawn here—do you want to extend it to catch them?" The dynamic scene analysis might also detect temporary or moving occlusions to the ground plane and the objects of interest, such as a front door that opens in front of the camera.

In some implementations the video rule creation engine 110 may automatically create rules based on the ground plane which are most likely to detect objects of interest within the field of view. Knowledge of the ground plane is important in rejecting many types of spurious motion, such as shadows, lights, and leaves blowing on the ground, as well as rustling leaves in the trees. For example, the video rule creation engine 110 may create a rule that an image is sent only when a person walks onto grass on a ground plane in a scene.

In some implementations, the video rule creation engine 110 may determine a shape for a rule based on detection of trees or other occlusions. The video rule creation engine 110 may determine from the video if any trees or other occlusions are blocking or overhanging a rule that has a shape on a driveway and manipulate the shape of the rule to go around the tree. For example, instead of drawing a perfect trapezoid shape of the driveway, one side of the trapezoid may have a curve in it to go around a tree blocking the view of the driveway. Accordingly, movement of the tree or leaves of the tree won't trigger false detections.

In some implementations, if the video rule creation engine 110 determines that no ground plane is visible from the camera view, the video rule creation engine 11 can either recommend alternate placement of the camera 112 or switch to a detection mode that is not based on ground plane rules. This could include using image-plane based geometry to evaluate the rules or switching to a different set of algorithms, such as using a convolutional neural network based human detector.

In some implementations the client device 120 may perform some of the actions described as being performed by the video rule creation engine 110. For example, the video rule creation engine 110 may provide the client device 120 information that describes shapes of elements in an image and a description of the elements. The client device 120 may then determine whether a user inputted shape sufficiently matches a shape of an element and then prompt the user to determine whether the user would like to reshape the region. In another example, the video rule creation engine 110 may be incorporated in the client device 120.

Figure 2:
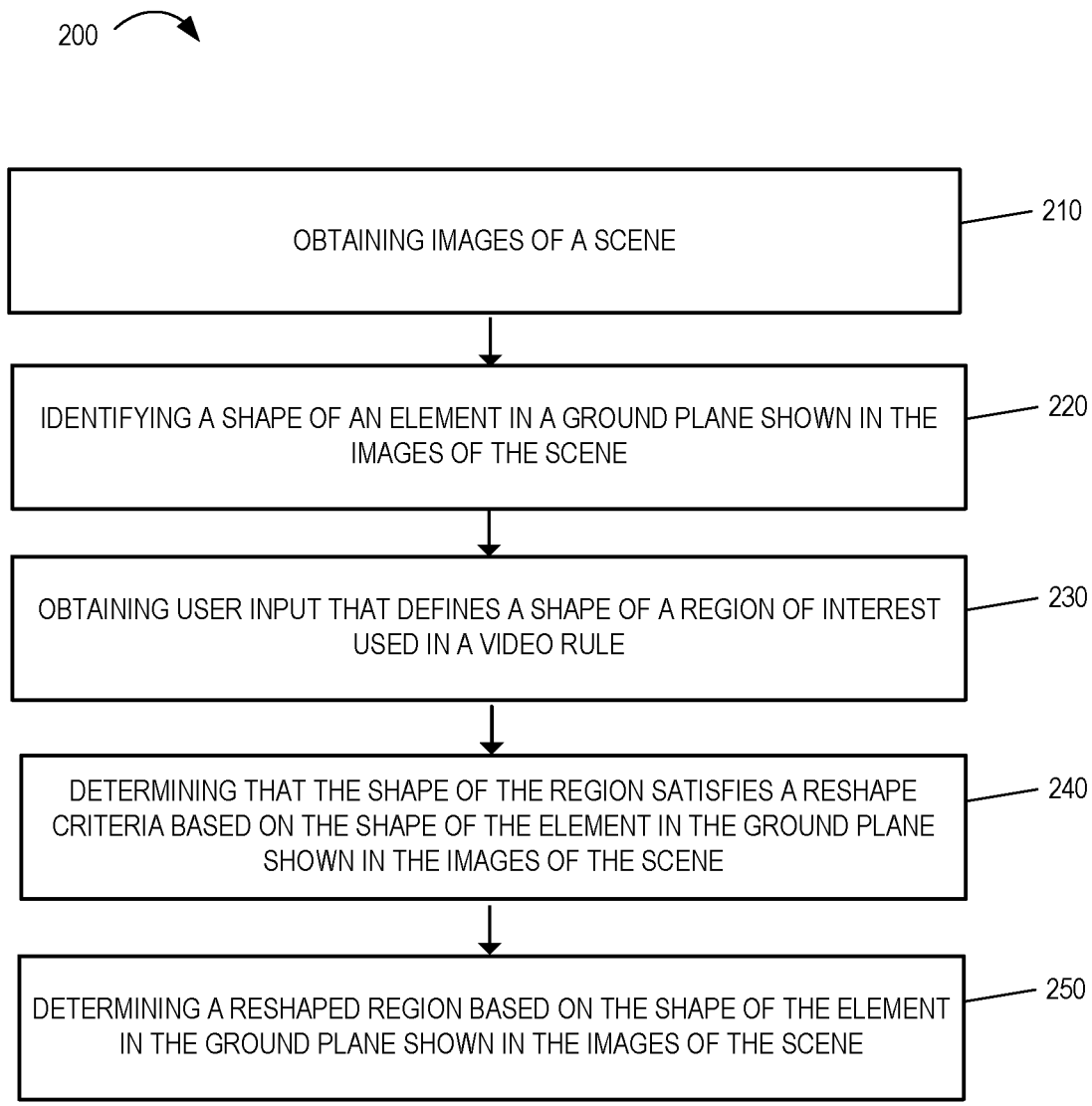
FIG. 2 illustrates an example process for assisting creation of video rules via scene analysis.

FIG. 2 illustrates an example process for assisting creation of video rules via scene analysis. Briefly, the process 200 may include obtaining images of a scene (210), identifying a shape of an element in a ground plane shown in the images of the scene (220), obtaining user input that defines a shape of a region of interest used in a video rule (230), determining that the shape of the region satisfies a reshape criteria based on the shape of the element in the ground plane shown in the images of the scene (240), and determining a reshaped region based on the shape of the element in the ground plane shown in the images of the scene (250).

In more detail, the process 200 may include obtaining images of a scene (210). For example, the video rule creation engine 110 may receive images of a front yard. The images may be captured by a camera and form a video. For example, the video rule creation engine 110 may receive video from the camera 112 where the camera has a view of the front yard of a property.

The process 200 may include identifying a shape of an element in a ground plane shown in the images of the scene (220). For example, the video rule creation engine 110 may analyze the images to identify an arc shape that corresponds to a sidewalk. The video rule creation engine 110 may analyze the images to identify areas that appear different and then determine what the areas are. For example, the video rule creation engine 110 may determine that there is an area in the images that is light grey that is bordered by green areas in the images and, in response, identify the area that is light grey as a sidewalk and the green areas as a yard.

The process 200 may include obtaining user input that defines a shape of a region of interest used in a video rule (230). For example, the video rule creation engine 110 may receive a user inputted shape from the client device 120. The user input may be received in response to the video rule creation engine 110 providing the video or an image from the video to a user to draw a shape of interest.

In some implementations, obtaining user input that defines a shape of a region of interest used in a video rule includes obtaining another image of the scene after the shape of the element in the ground plane shown in the images of the scene is identified, providing the another image of the scene from which the shape of the element in the ground plane shown in the images of the scene was not identified, and obtaining the user input while the another image of the scene is displayed. For example, the server may determine a shape of a driveway from images of the driveway taken a day before it snowed, receive a current image from the camera showing snow covering a portion of a driveway, and display the current image from the camera while prompting the user to draw a shape.

The process 200 may include determining that the shape of the region satisfies a reshape criteria based on the shape of the element in the ground plane shown in the images of the scene (240). In some implementations, determining that the shape of the region satisfies a reshape criteria based on the shape of the element in the ground plane shown in the images of the scene includes determining that a similarity of the shape of the region to the shape of the element in the ground plane satisfies a similarity threshold and in response to determining that the similarity of the shape of the region to the shape of the element in the ground plane satisfies the similarity threshold, determining that the shape of the region satisfies the reshape criteria.

For example, the video rule creation engine 110 may determine that the shape input by the user is a 90% match to a trapezoid shape of a driveway that was identified and accordingly satisfies reshape criteria that includes determining that a similarity threshold of a match between 80% and 100% is satisfied. The process 200 may include first identifying an element that is a closest match to the shape input by the user and then determining whether the element that is the closest match is sufficiently similar to the shape input by the user.

The process 200 may include determining a reshaped region based on the shape of the element in the ground plane shown in the images of the scene (250). For example, the video rule creation engine 110 may determine a reshaped region with a shape that matches the shape of the driveway.

The process 200 may include generating a video rule based on the reshaped region and providing the video rule based on the reshaped region to a camera that captured the images of the scene. For example, a server may perform process 200, generate a video rule that specifies that whenever a person's feet appear in the reshaped region then the user should be notified, and then transmit the video rule to the camera to use going forward.

In some implementations, generating a video rule based on the reshaped region may include providing an indication of the reshaped region to a user and receiving second user input that indicates to use the reshaped region for the video rule, where generating the video rule based on the reshaped region is in response to receiving the second input that indicates to use the reshaped region for the video rule. For example, in response to determining the reshaped region, the server may cause an outline of the reshaped region to be displayed on an image of the scene along with a prompt "Do you want to accept this reshaped region or the shape you originally drew," and in response to receiving an input of a selection of a "Yes" button, generate a video rule based on the reshaped region.

In some implementations, generating a video rule based on the reshaped region occurs without additional input from a user after obtaining the user input that defines the shape of the region of interest used in the video rule. For example, the server may determine to generate a video after determining the reshaped region without providing the prompt described in the prior example.

Figure 3:
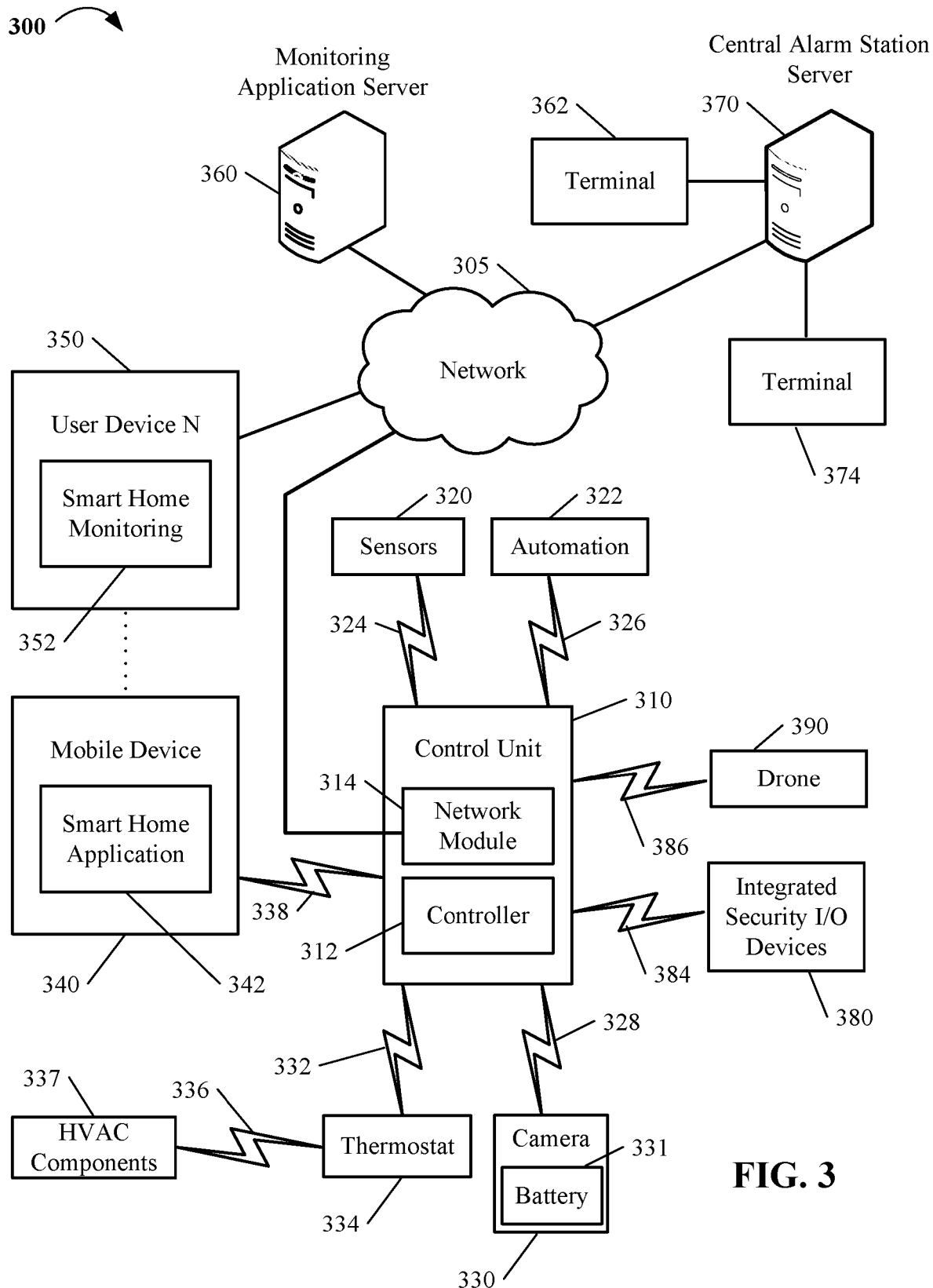
FIG. 3 is block diagram of an example system for assisted creation of video rules via scene analysis.

FIG. 3 is a block diagram of an example system 300 for assisted creation of video rules via scene analysis. The electronic system 300 includes a network 305, a control unit 310, one or more user devices 340 and 350, a monitoring application server 360, and a central alarm station server 370. In some examples, the network 305 facilitates communications between the control unit 310, the one or more user devices 340 and 350, the monitoring application server 360, and the central alarm station server 370. The video rule creation engine 110 may be provided on the monitoring application server 360 and the client device 120 may be one of the user devices 340 and 350.

The network 305 is configured to enable exchange of electronic communications between devices connected to the network 305. For example, the network 305 may be configured to enable exchange of electronic communications between the control unit 310, the one or more user devices 340 and 350, the monitoring application server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system.

In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voiceband modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The control unit 310 communicates with the module 322 and the camera 330 to perform monitoring. The module 322 is connected to one or more devices that enable home automation control. For instance, the module 322 may be connected to one or more lighting systems and may be configured to control operation of the one or more lighting systems. Also, the module 322 may be connected to one or more electronic locks at the property and may be configured to control operation of the one or more electronic locks (e.g., control Z-Wave locks using wireless communications in the Z-Wave protocol. Further, the module 322 may be connected to one or more appliances at the property and may be configured to control operation of the one or more appliances. The module 322 may include multiple modules that are each specific to the type of device being controlled in an automated manner. The module 322 may control the one or more devices based on commands received from the control unit 310. For instance, the module 322 may cause a lighting system to illuminate an area to provide a better image of the area when captured by a camera 330. The camera 330 can include one or more batteries 331 that require charging. A drone 390 can be used to survey the electronic system 300. In particular, the drone 390 can capture images of each item found in the electronic system 300 and provide images to the control unit 310 for further processing. Alternatively, the drone 390 can process the images to determine an identification of the items found in the electronic system 300.

The camera 330 may be a video/photographic camera or other type of optical sensing device configured to capture images. For instance, the camera 330 may be configured to capture images of an area within a building or within a residential property 102 monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the module 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring application server 360 over the Internet. In these implementations, image data captured by the camera 330 does not pass through the control unit 310 and the camera 330 receives commands related to operation from the monitoring application server 360.

The system 300 also includes thermostat 334 to perform dynamic environmental control at the property. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a property and/or environmental data at a property, e.g., at various locations indoors and outdoors at the property. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy-monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334.

A module 337 is connected to one or more components of an HVAC system associated with a property, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy-monitoring information and the state of the HVAC system components to the thermostat 334 and can control the one or more components of the HVAC system based on commands received from the thermostat 334.

In some examples, the system 300 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 300 for use in appropriate circumstances. For instance, a robotic vacuum cleaner device may be associated with the monitoring system 300 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 310, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 310. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 300. For instance, after completion of a monitoring operation or upon instruction by the control unit 310, the robotic devices may be configured to automatically fly to and land on one of the charging stations. In this regard, the robotic devices may automatically maintain a fully charged battery in a state in which the robotic devices are ready for use by the monitoring system 300.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices. Additionally, the one or more control units 310 may receive one or more sensor data from the sensors 320 and determine whether to provide an alert to the one or more integrated security input/output devices 380.

The sensors 320, the module 322, the camera 330, the thermostat 334, drone 390, and the integrated security devices 380 communicate with the controller 312 over communication links 324, 326, 328, 332, 384, and 386. The communication links 324, 326, 328, 332, 384, and 386 may be a wired or wireless data pathway configured to transmit signals from the sensors 320, the module 322, the camera 330, the thermostat 334, the drone 390, and the integrated security devices 380 to the controller 312. The sensors 320, the module 322, the camera 330, the thermostat 334, the drone 390, and the integrated security devices 380 may continuously transmit sensed values to the controller 312, periodically transmit sensed values to the controller 312, or transmit sensed values to the controller 312 in response to a change in a sensed value. In some implementations, the drone 390 can communicate with the monitoring application server 360 over network 305. The drone 390 can connect and communicate with the monitoring application server 360 using a Wi-Fi or a cellular connection.

The communication links 324, 326, 328, 332, 384, and 386 may include a local network. The sensors 320, the module 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 3 (CAT6) wired Ethernet network. The local network may be a mesh network constructed based on the devices connected to the mesh network.

The monitoring application server 360 is an electronic device configured to provide monitoring services by exchanging electronic communications with the control unit 310, the one or more user devices 340 and 350, and the central alarm station server 370 over the network 305. For example, the monitoring application server 360 may be configured to monitor events (e.g., alarm events) generated by the control unit 310. In this example, the monitoring application server 660 may exchange electronic communications with the network module 314 included in the control unit 310 to receive information regarding events (e.g., alerts) detected by the control unit server 104a. The monitoring application server 360 also may receive information regarding events (e.g., alerts) from the one or more user devices 340 and 350.

In some examples, the monitoring application server 360 may route alert data received from the network module 314 or the one or more user devices 340 and 350 to the central alarm station server 370. For example, the monitoring application server 360 may transmit the alert data to the central alarm station server 370 over the network 305.

The monitoring application server 360 may store sensor and image data received from the monitoring system and perform analysis of sensor and image data received from the monitoring system. Based on the analysis, the monitoring application server 360 may communicate with and control aspects of the control unit 310 or the one or more user devices 340 and 350.

The central alarm station server 370 is an electronic device configured to provide alarm monitoring service by exchanging communications with the control unit 310, the one or more mobile devices 340 and 350, and the monitoring application server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring application server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more user devices 340 and 350 are devices that host and display user interfaces. For instance, the user device 340 is a mobile device that hosts one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring application server 360 and/or the control unit 310 over the network 305. The user device 350 may be configured to display a smart home user interface 352 that is generated by the user device 350 or generated by the monitoring application server 360. For example, the user device 350 may be configured to display a user interface (e.g., a web page) provided by the monitoring application server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Zwave, Zigbee, HomePlug (ethernet over powerline), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring application server 360 may relay data received from the control unit 310 to the one or more user devices 340 and 350 through the network 305. In this regard, the monitoring application server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring application server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring application server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 only includes the one or more user devices 340 and 350, the sensors 320, the module 322, the camera 330, and the robotic devices. The one or more user devices 340 and 350 receive data directly from the sensors 320, the module 322, the camera 330, and the robotic devices and sends data directly to the sensors 320, the module 322, the camera 330, and the robotic devices. The one or more user devices 340, 350 provide the appropriate interfaces/processing to provide visual surveillance and reporting.

In other implementations, the system 300 further includes network 305 and the sensors 320, the module 322, the camera 330, the thermostat 334, and the robotic devices are configured to communicate sensor and image data to the one or more user devices 340 and 350 over network 305 (e.g., the Internet, cellular network, etc.). In yet another implementation, the sensors 320, the module 322, the camera 330, the thermostat 334, and the robotic devices (or a component, such as a bridge/router) are intelligent enough to change the communication pathway from a direct local pathway when the one or more user devices 340 and 350 are in close physical proximity to the sensors 320, the module 322, the camera 330, the thermostat 334, and the robotic devices to a pathway over network 305 when the one or more user devices 340 and 350 are farther from the sensors 320, the module 322, the camera 330, the thermostat 334, and the robotic devices. In some examples, the system leverages GPS information from the one or more user devices 340 and 350 to determine whether the one or more user devices 340 and 350 are close enough to the sensors 320, the module 322, the camera 330, the thermostat 334, and the robotic devices to use the direct local pathway or whether the one or more user devices 340 and 350 are far enough from the sensors 320, the module 322, the camera 330, the thermostat 334, and the robotic devices that the pathway over network 305 is required. In other examples, the system leverages status communications (e.g., pinging) between the one or more user devices 340 and 350 and the sensors 320, the module 322, the camera 330, the thermostat 334, and the robotic devices to determine whether communication using the direct local pathway is possible. If communication using the direct local pathway is possible, the one or more user devices 340 and 350 communicate with the sensors 320, the module 322, the camera 330, the thermostat 334, and the robotic devices using the direct local pathway. If communication using the direct local pathway is not possible, the one or more user devices 340 and 350 communicate with the sensors 320, the module 322, the camera 330, the thermostat 334, and the robotic devices using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 uses several techniques to reduce costs while providing access to significant levels of useful visual information.

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "Away" state, but set not to capture images when the alarm system is armed in a "Stay" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining images of a scene captured by a camera at a property;
   identifying a shape of an object that forms at least part of ground shown in the images of the scene;
   obtaining user input that defines a shape of a region of interest used in a video rule;
   determining that a similarity, between the shape of the region defined by the user input and the shape identified of the object that forms at least part of the ground plane shown in the images of the scene, satisfies a reshape criteria; and
   based on determining that the similarity, between the shape of the region defined by the user input and the shape identified of the object that forms at least part of the ground shown in the images of the scene, satisfies the reshape criteria, generating the video rule based on the shape of the object that forms at least part of the ground shown in the images of the scene.

2. The method of claim 1, wherein determining that a similarity satisfies a reshape criteria comprises:
   determining that the similarity of the shape of the region to the shape of the element in the ground plane satisfies a similarity threshold; and
   in response to determining that the similarity of the shape of the region to the shape of the element in the ground plane satisfies the similarity threshold, determining that the shape of the region satisfies the reshape criteria.

3. The method of claim 2, wherein determining that the similarity of the shape of the region to the shape of the element in the ground plane satisfies a similarity threshold comprises:
   determining that the similarity of the shape of the region to a trapezoid shape of a driveway identified in the ground plane satisfies the similarity threshold.

4. The method of claim 1, comprising:
   providing the video rule based on the reshaped region to the camera that captured the images of the scene.

5. The method of claim 1, comprising:
   providing an indication of the shape of the object that forms at least part of the ground shown in the images of the scene to a user; and
   receiving second user input that indicates to use the shape of the object that forms at least part of the ground shown in the images of the scene for the video rule, wherein generating the video rule based on the shape of the object that forms at least part of the ground shown in the images of the scene is in response to receiving the second input that indicates to use the reshaped region for the video rule.

6. The method of claim 1, wherein generating a video rule based on the shape of the object that forms at least part of the ground shown in the images of the scene occurs without additional input from a user after obtaining the user input that defines the shape of the region of interest used in the video rule.

7. The method of claim 1, wherein obtaining user input that defines a shape of a region of interest used in a video rule comprises:
   obtaining another image of the scene after the shape of the element in the ground plane shown in the images of the scene is identified;
   providing the another image of the scene from which the shape of the element in the ground plane shown in the images of the scene was not identified; and
   obtaining the user input while the another image of the scene is displayed.

8. A system comprising:
   one or more computers and one or more storage devices storing instructions that are operable, when executed by the one or more computers, to cause the one or more computers to perform operations comprising:
      obtaining images of a scene captured by a camera at a property;
      identifying a shape of an object that forms at least part of ground shown in the images of the scene;
      obtaining user input that defines a shape of a region of interest used in a video rule;
      determining that a similarity, between the shape of the region defined by the user input and the shape identified of the object that forms at least part of the ground plane shown in the images of the scene, satisfies a reshape criteria; and
      based on determining that the similarity, between the shape of the region defined by the user input and the shape identified of the object that forms at least part of the ground shown in the images of the scene, satisfies the reshape criteria, generating the video rule based on the shape of the object that forms at least part of the ground shown in the images of the scene.

9. The system of claim 8, wherein determining that a similarity satisfies a reshape criteria comprises:
   determining that the similarity of the shape of the region to the shape of the element in the ground plane satisfies a similarity threshold; and
   in response to determining that the similarity of the shape of the region to the shape of the element in the ground plane satisfies the similarity threshold, determining that the shape of the region satisfies the reshape criteria.

10. The system of claim 9, wherein determining that the similarity of the shape of the region to the shape of the element in the ground plane satisfies a similarity threshold comprises:
    determining that the similarity of the shape of the region to a trapezoid shape of a driveway identified in the ground plane satisfies the similarity threshold.

11. The system of claim 8, the operations comprising:
    providing the video rule based on the reshaped region to the camera that captured the images of the scene.

12. The system of claim 8, the operations comprising:
    providing an indication of the shape of the object that forms at least part of the ground shown in the images of the scene to a user; and receiving second user input that indicates to use the shape of the object that forms at least part of the ground shown in the images of the scene for the video rule, wherein generating the video rule based on the shape of the object that forms at least part of the ground shown in the images of the scene is in response to receiving the second input that indicates to use the reshaped region for the video rule.

13. The system of claim 8, wherein generating a video rule based on the shape of the object that forms at least part of the ground shown in the images of the scene occurs without additional input from a user after obtaining the user input that defines the shape of the region of interest used in the video rule.

14. The system of claim 8, wherein obtaining user input that defines a shape of a region of interest used in a video rule comprises:

obtaining another image of the scene after the shape of the element in the ground plane shown in the images of the scene is identified;

providing the another image of the scene from which the shape of the element in the ground plane shown in the images of the scene was not identified; and obtaining the user input while the another image of the scene is displayed.

15. A non-transitory computer-readable medium storing software comprising instructions executable by one or more computers which, upon such execution, cause the one or more computers to perform operations comprising:

obtaining images of a scene captured by a camera at a property;

identifying a shape of an object that forms at least part of ground shown in the images of the scene;

obtaining user input that defines a shape of a region of interest used in a video rule;

determining that a similarity, between the shape of the region defined by the user input and the shape identified of the object that forms at least part of the ground plane shown in the images of the scene, satisfies a reshape criteria; and based on determining that the similarity, between the shape of the region defined by the user input and the shape identified of the object that forms at least part of the ground shown in the images of the scene, satisfies the reshape criteria, generating the video rule based on the shape of the object that forms at least part of the ground shown in the images of the scene.

16. The medium of claim 15, wherein determining that a similarity satisfies a reshape criteria comprises:

determining that the similarity of the shape of the region to the shape of the element in the ground plane satisfies a similarity threshold; and in response to determining that the similarity of the shape of the region to the shape of the element in the ground plane satisfies the similarity threshold, determining that the shape of the region satisfies the reshape criteria.

17. The medium of claim 16, wherein determining that the similarity of the shape of the region to the shape of the element in the ground plane satisfies a similarity threshold comprises:

determining that the similarity of the shape of the region to a trapezoid shape.

18. The medium of claim 15, the operations comprising: providing the video rule based on the reshaped region to the camera that captured the images of the scene.

19. The medium of claim 15, the operations comprising: providing an indication of the shape of the object that forms at least part of the ground shown in the images of the scene to a user; and receiving second user input that indicates to use the shape of the object that forms at least part of the ground shown in the images of the scene for the video rule, wherein generating the video rule based on the shape of the object that forms at least part of the ground shown in the images of the scene is in response to receiving the second input that indicates to use the reshaped region for the video rule.

20. The medium of claim 15, wherein generating a video rule based on the shape of the object that forms at least part of the ground shown in the images of the scene occurs without additional input from a user after obtaining the user input that defines the shape of the region of interest used in the video rule.

* * * * *